United States Patent [19]

Akiyoshi

[11] Patent Number: 4,905,735
[45] Date of Patent: Mar. 6, 1990

[54] REFRIGERANT TRANSPORTING HOSE

[75] Inventor: Koji Akiyoshi, Inuyama, Japan

[73] Assignee: Tokai Rubber Industries, Ltd., Aichi, Japan

[21] Appl. No.: 275,510

[22] Filed: Nov. 23, 1988

[30] Foreign Application Priority Data

Nov. 28, 1987 [JP] Japan .................. 62-300686

[51] Int. Cl.$^4$ ............................................. F16L 11/08
[52] U.S. Cl. ........................................ 138/126; 138/125; 138/137; 428/212; 428/215; 428/131; 428/492; 428/494; 428/36.1; 428/36.2; 428/36.91; 428/36.8
[58] Field of Search ................. 428/36.1, 36.2, 36.91, 428/36.8, 212, 215, 131, 492, 494; 138/124, 125, 126, 137

[56] References Cited

U.S. PATENT DOCUMENTS

| | | | |
|---|---|---|---|
| 2,564,602 | 9/1946 | Hurst | 138/127 |
| 2,800,145 | 5/1953 | Pierls et al. | 138/137 |
| 2,899,982 | 8/1959 | Harpfer | 138/126 |
| 3,528,260 | 8/1968 | Binder | 138/126 |
| 4,209,042 | 6/1980 | Buan | 138/126 |
| 4,330,017 | 5/1982 | Satoh et al. | 138/126 |
| 4,633,912 | 1/1987 | Pilkington | 138/132 |
| 4,734,305 | 3/1988 | Sugimoto | 428/36.2 |

FOREIGN PATENT DOCUMENTS

| | | | |
|---|---|---|---|
| 57-2099 | 1/1982 | Japan | 428/36.2 |
| 91082 | 5/1985 | Japan . | |
| 6482 | 1/1986 | Japan . | |

Primary Examiner—Ellis P. Robinson
Assistant Examiner—Archene A. Turner
Attorney, Agent, or Firm—Oliff & Berridge

[57] ABSTRACT

A refrigerant transporting hose having an inner tube including an inner and an outer rubber layer and an intermediate resinous layer interposed between the inner and outer rubber layers; an outer tube formed of a rubber material located radially outwardly of the inner tube; and a reinforcing fiber layer interposed between the inner and outer tubes, such that the fiber layer and the inner and outer tubes constitute an integral tubular body, the inner rubber layer of the inner tube having a resistance to water permeation as high as, or higher than, that of the outer rubber layer. The inner rubber layer may be formed of a rubber material selected from the group consisting of acrylonitrile-butadiene rubber (NBR), chlorosulfonated polyethylene (CSM), chlorinated polyethylene (CPE), epichlorohydrin rubber (CHC, CHR), chloroprene rubber (CR), chlorinated isobutylene-isoprene rubber (Cl-IIR) and ethylene propylene diene rubber (EPDM). The intermediate resinous layer may be formed of a resin selected from the group consisting of polyamide resin, saponified ethylene-vinyl acetate copolymer and a blend of polyamide and rubber material. The outer rubber layer may be formed of a rubber material selected from the group consisting of NBR, CSM, CPE, CHC, CHR, CR, Cl-IIR and EPDM.

7 Claims, 1 Drawing Sheet

REFRIGERANT TRANSPORTING HOSE

BACKGROUND OF THE INVENTION

1. Field of the Invention

The present invention relates to a refrigerant transporting hose and particularly to such hoses suitable for providing piping for car coolers, air conditioners and the like which are employed in automotive vehicles.

2. Related Art Statement

Referring to FIG. 2, there is shown a known hose for transporting or conducting a refrigerant such as Freon (fluorohydrocarbon). The hose has a three-laminated or layered structure consisting of an inner and an outer rubber tube 101, 103 and a reinforcing fiber layer 102 interposed between the inner and outer tubes 101, 103. The inner rubber tube 101 is formed of acrylonitrile-butadiene rubber (NBR), chlorosulfonated polyethylene rubber (CSR) or the like, the reinforcing fiber layer 102 is formed of polyester fiber, vinylon fiber (polyvinyl alcohol synthetic fiber) or the like, and the outer rubber tube 103 is formed of ethylene propylene diene rubber (EPDM), chloroprene rubber (CR) or the like. Reference numerals 115 designate spiking holes which are formed through the outer rubber tube 103 so as to communicate the reinforcing fiber layer 102 with ambient atmosphere outside the hose. The spiking holes 115 serve to relieve a portion of the refrigerant (Freon) which has permeated the inner rubber tube 101, into the ambient atmosphere, thereby preventing the hose from being swollen due to the refrigerant otherwise trapped between the intermediate fiber layer 102 and the inner and/or outer rubber tubes 101, 103. Thus, the hose is free from the problem of separation or peeling of each of the three laminates (one layer and two tubes) from the others due to the trapped refrigerant. Being formed of rubber material except for the reinforcing fiber layer 102, the hose has a high flexibility. Accordingly, the hose can be handled with ease, for example to provide rubber piping. Also, the rubber hose has an excellent seal characteristic, so that the hose can be connected with high gas tightness to a nipple or other joints. Rubber materials, however, have a comparatively high gas permeability, that is, a comparatively low resistance to gas permeation therethrough. Therefore, the rubber hose suffers from the problem of leakage of the refrigerant gas conveyed therethrough (especially where Freon whose molecular weight is comparatively low is used as the refrigerant).

Referring to FIG. 3, there is shown another known refrigerant transporting hose including an innermost resin layer 204 formed of a polyamide resin, such as nylon 6, which has a high resistance to gas permeation. The innermost resin layer 204 and a rubber layer 205 formed of a rubber material such as NBR and located outside the resin layer 204 correspond to the inner rubber tube 101 of the hose of FIG. 2. The hose further includes a reinforcing fiber layer 202 formed on the outer surface of the rubber layer 205 and an outer rubber tube 203 formed on the outer surface of the reinforcing fiber layer 202. Reference numerals 215 designate spiking holes similar to those 115 of the hose of FIG. 2. Having the innermost resin layer 204 formed of nylon 6 or other polyamide resins that have a high resistance to gas permeation, the hose does not allow leakage of the refrigerant even if Freon whose molecular weight is comparatively low is used as the refrigerant. However, the hose suffers from a comparatively low flexibility due to the rigidity of the innermost resin layer 204. Accordingly, it is not easy to handle the hose, for example to provide rubber piping for a refrigerant-using device or apparatus. Furthermore, the hose suffers from the problem that the polyamide resin layer 204 is deteriorated or damaged due to metallic ions and/or metallic salts developed from metallic piping or other metallic parts.

As is apparent from the foregoing, none of the conventional refrigerant transporting hoses are satisfactory in quality.

SUMMARY OF THE INVENTION

It is therefore an object of the present invention to provide a refrigerant transporting hose which has a high resistance to gas permeation, a high flexibility and an excellent seal characteristic.

The above object can be achieved according to the principle of the present invention, which provides a refrigerant transporting hose comprising an inner tube including an inner and an outer rubber layer and an intermediate resinous layer interposed between the inner and outer rubber layers; an outer tube of a rubber material located radially outwardly of the inner tube; and a reinforcing fiber layer interposed between the inner tube and the outer tube, such that the reinforcing fiber layer and the inner and outer tubes constitute an integral tubular body, the inner rubber layer of the inner tube being formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber, the intermediate resinous layer of the inner tube being formed of a resinous material selected from the group consisting of polyamide resin, saponified ethylene-vinyl acetate copolymer and a blend of polyamide resin and rubber material, the outer rubber layer of the inner tube being formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber, the inner rubber layer having a resistance to water permeation as high as, or higher than, a resistance to water permeation of the outer rubber layer.

In the refrigerant transporting hose constructed as described above, the inner tube has a three-laminated or layered structure, that is, is constituted by the inner and outer rubber layers and the intermediate resinous layer interposed therebetween, whereby the resinous layer is not directly exposed to inside space. Consequently, the resinous layer is protected against deterioration due to metallic ions or other harmful matters. Moreover, the resinous layer is formed of a resinous material, such as polyamide resin, polyamide-rubber blend or saponified ethylene-vinyl acetate copolymer, which is capable of bearing a comparatively large amount of moisture therein and thereby being softened to a significant extent, and the resistance to water permeation of the inner rubber layer is determined to be as high as, or higher than, that of the outer rubber layer. Accordingly, the resinous layer whose rigidity is intrinsically considerably high, is softened to a significant extent due to moisture from the ambient atmosphere outside the hose.

The instant hose has a high resistance to gas permeation (that is, a low gas permeability). Furthermore, the hose has a high flexibility and an excellent seal characteristic because of provision of the resinous layer with the inner and outer rubber layers on both sides thereof. Therefore, the instant hose is preferably used for providing rubber piping for car coolers, air conditioners and other refrigerant-using devices which are required to maintain a high resistance to gas permeation as well as an excellent seal characteristic, for a long period of time.

In one embodiment of the hose of the present invention, the resistance to water permeation of the inner rubber layer of the inner tube is higher than the resistance to water permeation of the outer rubber layer.

In another embodiment of the hose of the invention, the intermediate resinous layer of the inner tube has a resistance to water permeation lower than the resistance to water permeation of each of the inner and outer rubber layers of the inner tube.

In yet another embodiment of the hose of the invention, the inner rubber layer of the inner tube has a radial thickness of 0.05-1 mm.

In still another embodiment of the hose of the invention, the outer rubber layer of the inner tube has a radial thickness of 1-3 mm.

In a further embodiment of the hose of the invention, the intermediate resinous layer of the inner tube has a radial thickness of 0.05-0.5 mm.

In another embodiment of the hose of the invention, the outer rubber tube has a plurality of spiking holes formed therethrough, the spiking holes communicating the reinforcing fiber layer with ambient atmosphere outside the hose.

According to another aspect of the present invention, there is provided a refrigerant transporting hose comprising an inner tube including an inner and an outer rubber layer and an intermediate resinous layer interposed between the inner and outer rubber layers; an outer tube of a rubber material located radially outwardly of the inner tube; and a reinforcing fiber layer interposed between the inner tube and the outer tube, such that the reinforcing fiber layer and the inner and outer tubes constitute an integral tubular body, the inner rubber layer of the inner tube having a resistance to water permeation higher than a resistance to water permeation of the outer rubber layer of the inner tube.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
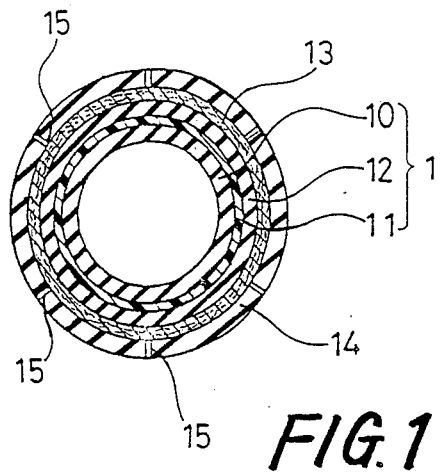
FIG. 1 is a transverse cross sectional view illustrating the structure of the refrigerant transporting hose of the present invention.
Figure 2:
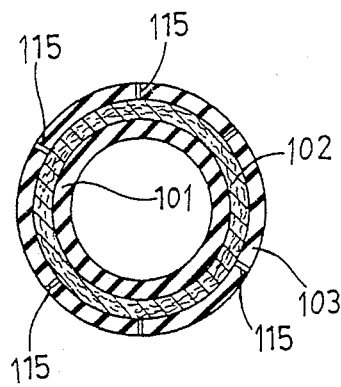
FIG. 2 is a transverse cross sectional view showing the structure of a conventional hose.

In FIG. 1 there is shown one embodiment of the refrigerant transporting hose of the present invention which consists of an inner and an outer rubber layer 10, 12, an intermediate resinous layer 11, a reinforcing fiber layer 13 and an outer rubber tube 14. Reference numerals 15 designate spiking holes which are formed through the outer rubber tube 14 so as to communicate the reinforcing fiber layer 13 with ambient atmosphere outside the hose. The inner and outer rubber layers 10, 12 and the intermediate resinous layer 11 constitute an inner tube 1, which corresponds to the inner rubber tube 101 of the prior art hose of FIG. 2.

The inner rubber layer 10 has rubber elasticity and provides the hose with high seal characteristic, whereby the hose can be connected with high gas tightness to a nipple or other joints. Furthermore, the inner rubber layer 10 serves to prevent the intermediate resinous layer 11 located radially outwardly thereof, from deterioration under the influence of metallic ions and/or metallic salts developed from metallic piping or other metallic parts.

The intermediate resinous layer 11 has a comparatively high rigidity as contrasted with the inner rubber layer 10. The resinous layer 11 serves to prevent a refrigerant conducted through the hose and having a comparatively low molecular weight, from permeating the hose toward the outside space.

The outer rubber layer 12 has rubber elasticity and serves to elastically support the intermediate resinous layer 11, whereby the instant hose is free from a problem that, if the reinforcing fiber layer 13 is formed directly on the resinous layer 11, the inner portion of the hose will be so rigid that the hose tends to be kinked (buckled) when bent and consequently be unable to restore its original profile.

The inner and outer rubber layers 10, 12 are formed of a rubber material as commonly used for forming inner portions of refrigerant transporting hoses, such as acrylonitrile-butadiene rubber (NBR), chlorosulfonated or chlorosulfonyl polyethylene (CSM), chlorinated polyethylene (CPE), epichlorohydrin rubber (CHC, CHR), chloroprene rubber (CR), chlorinated isobutylene-isoprene rubber (Cl-IIR) or ethylene propylene diene rubber (EPDM). The rubber materials used for forming the inner and outer rubber layers 10, 12 are selected according to the principle of the present invention, such that a resistance to water permeation of the inner rubber layer 10 is as high as, or higher than, that of the outer rubber layer 12. While regarding the prior art hose of FIG. 2 it had been proposed that the inner rubber tube 101 be formed of a rubber material with as high a resistance to water permeation as possible, so as to prevent the inside space through which the refrigerant is conveyed, from being influenced by moisture from the ambient atmosphere, the instant hose has been developed such that the rigid resinous layer 11 is softened to a considerable extent by positively utilizing the moisture absorption through the spiking holes 15, and that the innermost rubber layer 10 serves to prevent the absorbed moisture from permeating into the inside space.

TABLE I shows permeability coefficient of each of the above-indicated rubber materials. Greater permeability coefficient means lower resistance to water permeation, that is, easier permeation of water.

TABLE I

| MATERIALS | PERMEABILITY COEFFICIENTS (mg · mm/cm$^2$ · day) at 80° C. |
|---|---|
| NBR | 9.3 |
| CSM | 5.2 |

TABLE I-continued

| MATERIALS | PERMEABILITY COEFFICIENTS ($mg \cdot mm/cm^2 \cdot day$) at 80° C. |
| --- | --- |
| CPE | 4.7 |
| CHC | 7.5 |
| Cl-IIR | 6.8 |
| EPDM | 3.9 |
| CR | 6.8 |

Therefore, where the outer rubber layer 12 is formed of NBR, for example, it is required that the inner rubber layer 10 be formed of the same material NBR, or a different material, such as CSM, which has a permeability coefficient lower than that of NBR.

The intermediate resinous layer 11 interposed between the inner and outer rubber layers 10, 12 is required to have a high resistance to gas permeation therethrough (or a low gas permeability) and be capable of being softened as a result of moisture absorption. In view of these requirements, the resinous layer 11 is preferably formed of a polyamide resin such as nylon 6, nylon 66, nylon 612, nylon 11 and nylon 12, or saponified ethylene-vinyl acetate copolymer. Furthermore, the resinous layer 11 may be formed of a blend material consisting of polyamide resin and rubber material. The blend material is preferably prepared by using at least one of the above-indicated type polyamides and a rubber such as EPDM, CPE, Cl-IIR, CHC and CHR. It is recommened that the ratio of a proportion by weight of the polyamide to a proportion by weight of the rubber material in the blend material, fall within the range of 100/0 to 50/50.

TABLE II shows permeability coefficient of each of the above-indicated resins.

TABLE II

| MATERIALS | PERMEABILITY COEFFICIENTS ($mg \cdot mm/cm^2 \cdot day$) at 80° C. |
| --- | --- |
| NYLON 6 | 15.2 |
| SAPONIFIED ETHYLENE-VINYL ACETATE COPOLYMER | 13.4 |

The reinforcing fiber layer 13 is formed of a fiber material as typically used for producing hoses, such as polyester fiber, cotton fiber or other synthetic or natural fiber materials. The fiber layer 13 is formed on the outer rubber layer 12 by braiding, spiralling or knitting using such fiber material.

The outer rubber tube 14 is exposed to the ambient atmosphere. In view of weather resistance, heat resistance and water permeability, the outer rubber tube 14 is preferably formed of EPDM. However, the outer tube 14 may be formed of other rubber materials.

There will be described a method of manufacturing the refrigerant transporting hose having the above-described laminated structure.

At a first step, unvulcanized rubber composition is extruded from an extruder (not shown) so as to form an unvulcanized inner rubber layer 10 on a rubber mandrel (not shown).

Next, resin-type adhesive dissolved in a solvent is applied to the outer surface of the unvulcanized inner rubber layer 10, and subsequently heat-molten resin is extruded thereon so as to form an intermediate resinous layer 11. The thus-obtained intermediate product is cooled.

At the following step, the resin-type adhesive is applied to the outer surface of the resin layer 11, and unvulacanized rubber composition is extruded so as to form an outer rubber layer 12. Thus, the three-laminated tubular body is obtained.

Further, rubber adhesive is applied to the outer surface of the outer rubber layer 12, and subsequently a reinforcing fiber layer 13 is formed on the outer rubber layer 12 by braiding, spiralling or knitting using a suitable fiber material.

Next, rubber adhesive is applied to the outer surface of the reinforcing fiber layer 13, and unvulcanized rubber composition is extruded on the fiber layer 13 so as to form an outer rubber tube 14.

Last, the thus-obtained laminated tubular body (four layers and one tube) 10, 11, 12, 13, 14 are vulcanized to produce an integrally bonded end product (hose), and the rubber mandrel is removed from the hose. The vulcanizing temperature is selected to be at 145° to 170° C., and the vulcanizing time is selected to be at 30 to 90 minutes.

In the above-described manufacturing method, the thickness of the inner rubber layer 10 is selected at 0.05 to 1 mm, preferably about 0.5 mm. If the thickness of the inner rubber layer 10 is below the lower limit of the above range, the seal characteristic of the hose is deteriorated. On the other hand, if the thickness exceeds the upper limit of the range, the outer diameter of the inner rubber layer 10 is correspondingly increased, which leads to increasing the outer diameter of the intermediate resinous layer 11 to be formed outside the inner rubber layer 10, whereby the rigidity of the resinous layer 11 is raised. The resinous layer 11 with raised rigidity would have a higher bending resistance, thereby deteriorating the flexibility of the hose as a whole.

The thickness of the intermediate resinous layer 11 is selected at 0.05 to 0.5 mm, preferably about 0.2 mm. If the thickness is lower than the lower limit of the range, the resistance to gas permeation of the resinous layer 11 is deteriorated, thereby increasing a tendency to allow the refrigerant conveyed through the hose to permeate the hose toward the outside space. Conversely, if the thickness exceeds the upper limit of the range, the resinous layer 11 is increased in rigidity, thus leading to deteriorating the flexibility of the hose.

The outer rubber layer 12 is required to be so thick as to effectively reduce the kinkability of the hose that mainly depends upon the intermediate resinous layer 11 and the reinforcing fiber layer 13. Accordingly, the thickness of the outer rubber layer 12 is selected at 1 to 3 mm, preferably about 2 mm.

The thickness of the outer rubber tube 14 is selected at 1 to 2.5 mm, preferably about 1.4 mm. For improving the resistance to water permeation of the outer rubber tube 14, it is recommended that the thickness thereof be increased. However, if the thickness exceeds the upper limit of the above-indicated range, the ease to handle of the hose is deteriorated.

In the refrigerant transporting hose manufactured as described above, the resinous layer having a high resistance to gas permeation is protected by the inner rubber layer from being directly exposed to the inside space, whereby the resinous layer is free from the problem of deterioration due to metallic ions or other harmful matters. Furthermore, the resinous layer is formed of a resinous material whose rigidity is reducible due to absorption of moisture, and the inner and outer rubber layers sandwiching the resinous layer are formed such that the resistance to water permeation of the inner rubber layer is as high as, or higher than, that of the outer rubber layer. Consequently, the resinous layer is softened due to absorption of the moisture from the ambient atmosphere, thus leading to improving the ease to handle of the hose, while the inner rubber layer serves to prevent the absorbed moisture from permeating into the inside space through which the refrigerant is conveyed.

EXAMPLES

Figure 3:
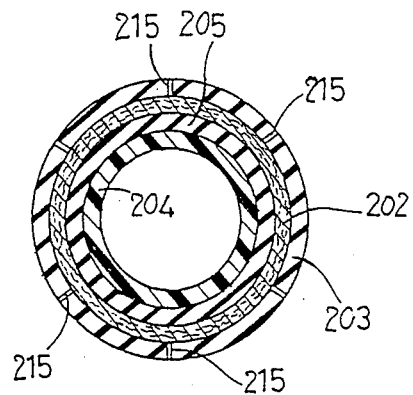
FIG. 3 is a transverse cross sectional view showing the structure of another conventional hose.

Referring to TABLE III, there are shown four invention hoses (Example 1 through 4) and one comparative hose (Example 5) which were manufactured by the above-illustrated method using the respective materials indicated in the table. In this connection, it is noted that the hose of Example 5 has a structure as shown in FIG. 3.

Flexibility was evaluated for each example (hose), as follows:

First, each hose is cut into a 25 cm long specimen, and maintained in ambient atmosphere of 60° C.×95% RH (relative humidity) for 168 hours. Subsequently, the specimen is wound around a mandrel having a radius of 8 cm, such that the specimen assumes a generally semi-annular profile. With the specimen assuming the semi-annular profile, the magnitude of bending stress exerted to one of opposite ends of the specimen was measured. Lower bending stress means higher flexibility. After the above-indicated moisture absorption step, each specimen is subjected to vacuum drying at 70° C. for 96 hours. Thereafter, each specimen underwent the same flexibility evaluating test as indicated above. The test results are shown in TABLE IV.

TABLE III

|  |  |  | INVENTION EXAMPLES | | | | COMPARATIVE EXAMPLE |
|---|---|---|---|---|---|---|---|
|  |  |  | 1 | 2 | 3 | 4 | 1 |
| INNER TUBE | INNER RUBBER LAYER | MATERIAL | NBR | CSM | CSM | CSM | — |
|  |  | THICKNESS (mm) | 0.5 | 0.5 | 0.5 | 0.5 |  |
|  | RESINOUS LAYER | MATERIAL | Ny6 | Ny6 | Ny6 | SEVA *1 | Ny6 |
|  |  | THICKNESS (mm) | 0.2 | 0.2 | 0.2 | 0.2 | 0.2 |
|  | OUTER RUBBER LAYER | MATERIAL | NBR | NBR | Cl-IIR | CSM | NBR |
|  |  | THICKNESS (mm) | 2.0 | 2.0 | 2.0 | 2.0 | 2.0 |
| REINFORCING FIBER LAYER |  | MATERIAL | PEF *2 | PEF | PEF | PEF | PEF |
| OUTER RUBBER TUBE |  | MATERIAL | EPDM | EPDM | EPDM | EPDM | EPDM |
|  |  | THICKNESS (mm) | 1.4 | 1.4 | 1.4 | 1.4 | 1.4 |

*1: Saponified ethylene-vinyl acetate copolymer
*2: Polyester fiber

TABLE IV

|  |  | INVENTION EXAMPLES | | | | COMPARATIVE EXAMPLE |
|---|---|---|---|---|---|---|
|  |  | 1 | 2 | 3 | 4 | 1 |
| BENDING STRESS (FLEXIBILITY) (kgf) | AFTER MOISTURE ABSORPTION | 1.2 | 1.1 | 1.1 | 1.2 | 1.0 |
|  | AFTER VACUUM DRYING | 2.4 | 2.0 | 2.1 | 2.1 | 2.8 |

As is apparent from the test results shown in TABLE IV, each of the invention hoses (Example 1 through 4) has an excellent flexibility even after the vacuum drying step.

While the present invention has been described in its presently preferred embodiment with a certain degree of particularity, it is to be understood that the invention is not limited to the precise details of the illustrated embodiment, but may be embodied with various changes, modifications and improvements, which may occur to those skilled in the art, without departing from the spirit and scope of the invention defined in the following claims.

What is claimed is:

1. A refrigerant transporting hose comprising:

an inner tube for transporting a refrigerant, said inner tube including an inner and an outer rubber layer and an intermediate resinous layer interposed between said inner and outer rubber layers, said intermediate resinous layer resisting permeation of refrigerant therethrough, said inner rubber layer having a thickness of 0.05 to 1 mm, said intermediate resin layer having a thickness of 0.05 to 0.5 mm, said outer rubber layer having a thickness of 1 to 3 mm, said intermediate resinous layer being adhesively bonded to said inner and outer rubber layers;

an outer tube of a rubber material located radially outwardly of said inner tube, said outer tube having a thickness of 1 to 2.5 mm; and a reinforcing fiber layer interposed between said inner tube and said outer tube, said reinforcing fiber layer being adhesively bonded to the inner and outer tubes to constitute an integral tubular body, said inner rubber layer of the inner tube being formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber, said intermediate resinous layer of the inner tube being formed of a resinous material selected from the group consisting of polyamide resin, saponified ethylene-vinyl acetate copolymer and a blend of polyamide resin and rubber material, said outer rubber layer of the inner tube being formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber, said inner rubber layer having a resistance to water permeation as high as, or higher than, a resistance to water permeation of said outer rubber layer, said intermediate resinous layer having a resistance to water permeation lower than the resistance to water permeation of each of said inner and outer rubber layers.

2. The hose as set forth in claim 1, wherein said resistance to water permeation of the inner rubber layer of the inner tube is higher than said resistance to water permeation of the outer rubber layer.

3. The hose as set forth in claim 1, wherein said outer rubber tube has a plurality of spiking holes formed therethrough, said spiking holes communicating said reinforcing fiber layer with ambient atmosphere outside the outer rubber tube.

4. A refrigerant transporting hose comprising:

an inner tube for transporting a refrigerant, said inner tube including an inner and an outer rubber layer and an intermediate resinous layer interposed between said inner and outer rubber layers, said intermediate resinous layer resisting permeation of refrigerant therethrough, said inner rubber layer having a thickness of 0.05 to 1 mm, said intermediate resin layer having a thickness of 0.05 to 0.5 mm, said outer rubber layer having a thickness of 1 to 3 mm, said intermediate resinous layer being adhesively bonded to said inner and outer rubber layers;

an outer tube of a rubber material located radially outwardly of said inner tube, said outer tube having a thickness of 1 to 2.5 mm; and a reinforcing fiber layer interposed between said inner tube and said outer tube, said reinforcing fiber layer being adhesively bonded to the inner and outer tubes to constitute an integral tubular body, said inner rubber layer of the inner tube having a resistance to water permeation higher than a resistance to water permeation of said outer rubber layer of the inner tube, said intermediate resinous layer of the inner tube having a resistance to water permeation lower than the resistance to water permeation of each of said inner and outer rubber layers.

5. The hose as set forth in claim 4, wherein said inner rubber layer of the inner tube is formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber.

6. The hose as set forth in claim 4, wherein said intermediate resinous layer of the inner tube is formed of a resinous material selected from the group consisting of polyamide resin, saponified ethylene-vinyl acetate copolymer and a blend of polyamide and rubber material.

7. The hose as set forth in claim 4, wherein said outer rubber layer of the inner tube is formed of a rubber material selected from the group consisting of acrylonitrile-butadiene rubber, chlorosulfonated polyethylene, chlorinated polyethylene, epichlorohydrin rubber, chloroprene rubber, chlorinated isobutylene-isoprene rubber and ethylene propylene diene rubber.

* * * * *